US010674110B2

(12) United States Patent
Abe

(10) Patent No.: US 10,674,110 B2
(45) Date of Patent: Jun. 2, 2020

(54) IMAGE ENCODING APPARATUS, AND CONTROL METHOD THEREOF

(71) Applicant: CANON KABUSHIKI KAISHA, Tokyo (JP)

(72) Inventor: Takahiro Abe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 41 days.

(21) Appl. No.: 16/022,849

(22) Filed: Jun. 29, 2018

(65) Prior Publication Data

US 2019/0020851 A1 Jan. 17, 2019

(30) Foreign Application Priority Data

Jul. 11, 2017 (JP) ................ 2017-135657

(51) Int. Cl.
*H04N 5/232* (2006.01)
*H04N 5/917* (2006.01)
*H04N 19/70* (2014.01)
*H04N 19/119* (2014.01)
*G06T 3/40* (2006.01)
*H04N 5/77* (2006.01)
*H04N 19/59* (2014.01)
*H04N 9/80* (2006.01)
*G03B 37/02* (2006.01)
(Continued)

(52) U.S. Cl.
CPC ............ *H04N 5/917* (2013.01); *G03B 37/02* (2013.01); *G06T 3/4038* (2013.01); *H04N 5/232* (2013.01); *H04N 5/23238* (2013.01); *H04N 5/3415* (2013.01); *H04N 5/772* (2013.01); *H04N 9/80* (2013.01); *H04N 19/119* (2014.11); *H04N 19/59* (2014.11); *H04N 19/70* (2014.11); *H04N 2013/0088* (2013.01)

(58) Field of Classification Search
None
See application file for complete search history.

(56) References Cited

U.S. PATENT DOCUMENTS 6,677,981 B1 * 1/2004 Mancuso .............. G06T 3/4038 348/36
6,885,392 B1 * 4/2005 Mancuso .............. G06T 3/4038 348/218.1

(Continued)

FOREIGN PATENT DOCUMENTS

JP 2010-028764 A 2/2010

*Primary Examiner* — Twyler L Haskins
*Assistant Examiner* — Wesley J Chiu
(74) *Attorney, Agent, or Firm* — Venable LLP

(57) ABSTRACT

This invention encodes, using less memory, a wide-angle image obtained by performing image capturing a plurality of times. An apparatus includes a compositing unit that, each time an image capturing unit captures an image, crops a partial image of a predetermined region in the captured image, and composes the partial image with a composed image obtained from a previously captured image, an encoding unit that, when the composed image updated by the compositing unit has a pre-set size, encodes the image of the tile in the composed image, a releasing unit that releases an area used for the encoded tile in the memory, and a control unit that controls the compositing unit, the encoding unit, and the releasing unit so as to repeatedly perform operations until a pre-set condition is satisfied.

7 Claims, 13 Drawing Sheets

(51) Int. Cl.
*H04N 5/341* (2011.01)
*H04N 13/00* (2018.01)

(56) References Cited

U.S. PATENT DOCUMENTS

| | | | |
|---|---|---|---|
| 2007/0109398 A1* | 5/2007 | Teo | H04N 5/2628 |
| | | | 348/36 |
| 2009/0160969 A1* | 6/2009 | Kuroiwa | H04N 5/23293 |
| | | | 348/223.1 |
| 2010/0111429 A1* | 5/2010 | Wang | G06T 3/4038 |
| | | | 382/233 |
| 2012/0154642 A1* | 6/2012 | Ichikawa | H04N 1/409 |
| | | | 348/241 |
| 2013/0016180 A1* | 1/2013 | Ono | H04N 5/145 |
| | | | 348/36 |
| 2019/0037138 A1* | 1/2019 | Choe | H04N 5/272 |

\* cited by examiner

☐ REFERENCE TILE SIZE

▨ NON-CAPTURED REGION

▦ OVERWRITABLE REGION

⌐ ⌐ TILE SIZE OF LAST ENCODED TILE

▨ NON-CAPTURED REGION

⌐ ⌐ TILE SIZE OF LAST ENCODED TILE

▨ NON-CAPTURED REGION

▦ OVERWRITABLE REGION

☐ TILE SIZE OF ENCODED TILE    ⌐ ¬ DISPLAY REGION

☐ TILE SIZE OF ENCODED TILE

⌐ ¬ DISPLAY REGION

▨ NON-CAPTURED REGION

☐ TILE SIZE OF ENCODED TILE

⌐ ¬ DISPLAY REGION

▨ NON-CAPTURED REGION

⌐ ¬ DISPLAY REGION

IMAGE ENCODING APPARATUS, AND CONTROL METHOD THEREOF

BACKGROUND OF THE INVENTION

Field of the Invention

The present invention relates to a technique for encoding a wide-angle image obtained by composing a plurality of captured images.

Description of the Related Art

In recent years, JCT-VC (Joint Collaborative Team on Video Coding) has been promoting standardization of HEVC (High Efficiency Video Coding) that is a successor to H. 264 and is a next-generation video coding format. HEVC includes a profile for still images such as a Main Still Picture profile, and it is therefore possible to code not only video images but also still images.

Meanwhile, a technique is known in which a wide-angle image is generated by positioning and composing a plurality of images obtained through continuous image capturing while moving the image capture range by using a digital camera, a camera-enabled mobile phone, or the like. See, for example, Japanese Patent Laid-Open No. 2010-28764 (hereinafter referred to simply as "document"). Hereinafter, the technique described above will be referred to as "wide-angle composition", and the composed images will be referred to as "wide-angle composite images".

However, according to the method disclosed in the aforementioned document, more memory is required because encoding is performed after a wide-angle composite image has been generated by positioning a plurality of images obtained through continuous image capturing. Also, encoding is performed after completion of composition processing on the entire region of the image, which takes a long processing time from image capturing to completion of encoding. As a result, the user has to wait for a long time to check the wide-angle composite image on the display.

SUMMARY OF THE INVENTION

The present invention provides a technique with which it is possible to perform, using less memory, encode processing on a wide-angle composite image obtained by performing image capturing a plurality of times while changing the image capture direction, and reduce the time required from the end of image capturing to the completion of encoding as compared with conventional technology.

According to an aspect of the invention, there is provided an image encoding apparatus that encodes a wide-angle composite image obtained from a plurality of images captured while changing an image capture direction of an image capturing unit, the image encoding apparatus comprising: a memory for temporarily storing a captured image; a compositing unit that, each time a captured image captured by the image capturing unit is input, crops a partial image of a predetermined region in the input captured image, and positions and composes the partial image with a composed image obtained from a previously input captured image stored in the memory so as to update the composed image; an encoding unit that, when the composed image updated by the compositing unit has a pre-set size of an encode unit tile, encodes the image of the tile in the composed image; a releasing unit that releases the encoded tile so as to make the encoded tile overwritable in the memory; and a control unit that controls the compositing unit, the encoding unit, and the releasing unit so as to repeatedly perform operations until a pre-set condition is satisfied, and generates encoded data of the wide-angle composite image.

According to the present invention, it is possible to perform, using less memory, encode processing on a wide-angle composite image obtained by performing image capturing a plurality of times while changing the image capture direction, and reduce the time required from the end of image capturing to the completion of encoding as compared with conventional technology.

Further features of the present invention will become apparent from the following description of exemplary embodiments (with reference to the attached drawings).

DESCRIPTION OF THE EMBODIMENTS

Hereinafter, embodiments according to the present invention will be described in detail with reference to the accompanying drawings.

First Embodiment

Apparatus Configuration

Figure 1:
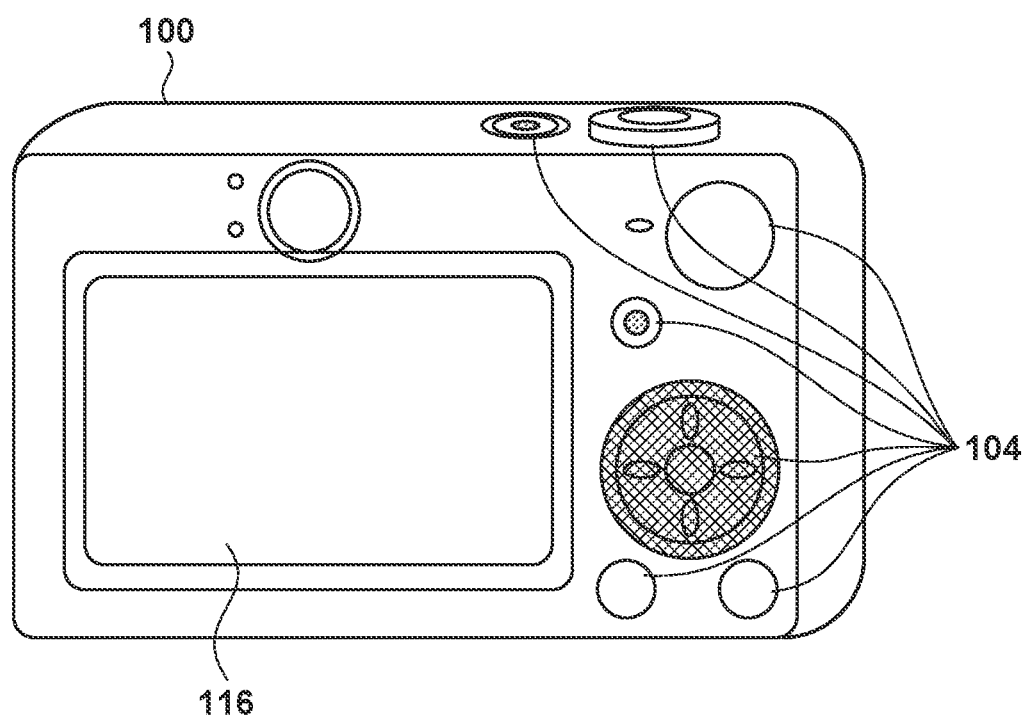
FIG. 1 is a perspective view of an image capturing apparatus to which an embodiment is applied.

FIG. 1 is a perspective view of an image capturing apparatus 100 to which an image encoding apparatus according to the present embodiment is applied. A lens is provided on the back side (not shown).

A display unit 116 is a display unit that displays images and various types of information. An operation unit 104 is an operation unit that includes operation members such as various types of switches, buttons, a shutter button, a mode switching button, a touch panel, and a controller wheel so as to receive various types of operations from the user. A power supply switch for switching power between on and off is also included in the operation unit.

Overall Block Diagram

Figure 2:
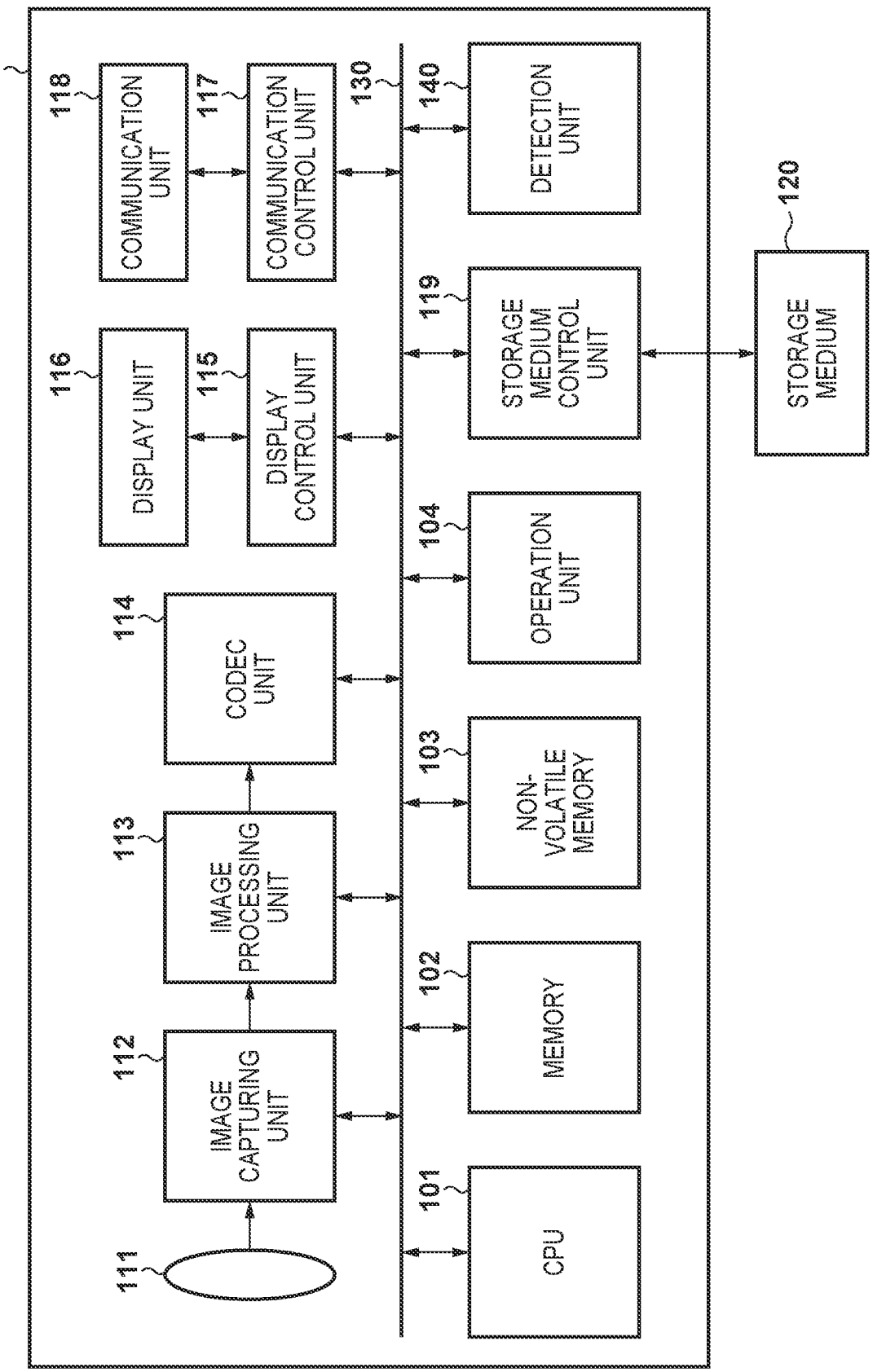
FIG. 2 is a block configuration diagram of the image capturing apparatus which the embodiment is applied.

FIG. 2 is a diagram showing a block configuration of the image capturing apparatus 100. As shown in FIG. 2, the image capturing apparatus 100 includes a CPU 101, a memory 102, a non-volatile memory 103, an operation unit 104, an imaging lens 111, an image capturing unit 112, an image processing unit 113, a codec unit 114, a display control unit 115, a display unit 116, a communication control unit 117, a communication unit 118, a storage medium control unit 119, a storage medium 120, a detection unit 140, and an internal bus 130.

The CPU 101 controls the operations of the constituent elements of the image capturing apparatus 100 by executing a computer program stored in the non-volatile memory 103. The memory 102 is a rewritable volatile memory (RAM), and temporarily stores the computer program for controlling the operations of the constituent elements of the image capturing apparatus 100, information such as parameters for the operations of the constituent elements, information received by the communication control unit 117, and the like. The memory 102 also functions as a work memory that temporarily stores images and information that have been processed by the image capturing unit 112, the image processing unit 113, the codec unit 114, and the like.

The non-volatile memory 103 is an electrically erasable and recordable memory, and for example, a storage medium such as an EEPROM or an SD memory card is used. The non-volatile memory 103 stores the computer program for controlling the operations of the constituent elements of the image capturing apparatus 100, and the information such as parameters for the operations of the constituent elements. As used herein, the computer program includes programs for executing various types of flowcharts, which will be described later in the present embodiment.

The operation unit 104 provides a user interface for operating the image capturing apparatus 100. The operation unit 104 includes a power supply button, a menu button, a shutter button, a mode switching button, and the like of the image capturing apparatus 100, and each button is formed by a switch, a touch panel, or the like. The CPU 101 controls the image capturing apparatus 100 in accordance with a user instruction input via the operation unit 104. The operation unit 104 may control the image capturing apparatus 100 in response to a remote control signal received from a remote controller (not shown), or a request notified from a mobile terminal (not shown) via the communication control unit 117.

The imaging lens 111 is composed of: a zoom lens, a lens group including focus lenses, a lens control unit, a diaphragm; and the like. The imaging lens 111 includes a lens control unit (not shown), and controls focus adjustment and an aperture value (F number) by using a control signal transmitted from the CPU 101.

The image capturing unit 112 includes an image sensor that converts an optical image of a subject to an electric signal. The image sensor is, for example, an area image sensor such as, for example, a CCD (charge coupled device), a CMOS (complementary metal-oxide semiconductor) device, or the like. The image capturing unit 112 outputs image data obtained through image capturing to the image processing unit 113 or the memory 102.

The image processing unit 113 performs, on the data output from the image capturing unit 112, or the data read out from the memory 102, predetermined processing such as resize processing such as pixel interpolation and reduction, image addition for matching the aspect ratio, and color transformation processing. Also, the image processing unit 113 performs predetermined computation processing using image data of a captured image, and the CPU 101 performs exposure control and ranging control based on the result of computation. Through this, AE (auto exposure) processing, AWB (auto white balance) processing, AF (auto focus) processing are performed.

Also, the image processing unit 113 performs a wide-angle composition in which image data is positioned, and a plurality of positioned images are composed to generate a wide-angle composite image. The wide-angle composition according to the present embodiment will be described later in detail.

The codec unit 114 compresses data size by performing intra-frame prediction and inter-frame prediction encode processing on the input image data. The codec unit 114 performs, for example, compression processing based on HEVC. The codec unit 114 will be described later in detail with reference to FIG. 3.

The display control unit 115 is a control unit for controlling the display unit 116. The display control unit 115 performs resize processing, color transformation processing, and the like so as to obtain an image that can be displayed on the display unit 116, and outputs the image signal to the display unit 116.

The display unit 116 is a liquid crystal display, an organic EL display, or the like, and displays images based on the image data transmitted from the display control unit 115. A touch panel is provided on the front side of the display unit 116, and the display unit 116 also functions as an operation unit that receives an operation from the user.

The communication control unit 117 is controlled by the CPU 101, and generates a modulation signal compliant with predetermined wireless communication standards such as IEEE 802.11, and then outputs the generated modulation signal to the communication unit 118. Also, the communication control unit 117 receives the modulation signal compliant with predetermined wireless communication standards from the communication unit 118, decodes the modulation signal so as to convert the signal from an analog to a digital form, and notifies the CPU 101 of the signal. Also, the communication control unit 117 includes a register for setting communication, and thus under control of the CPU 101, the communication control unit 117 can adjust transmission/reception sensitivity during communication, and perform transmission and reception based on a predetermined modulation scheme. The communication unit 118 includes an antenna, an analog circuit, and the like, the antenna being for outputting the modulation signal transmitted from the communication control unit 117 to the outside or receiving a modulation signal from the outside.

The storage medium control unit 119 is a control unit for controlling the storage medium 120, and outputs a control signal for controlling the storage medium 120 upon receiving a request from the CPU 101. The storage medium 120 is a removable or embedded non-volatile memory, magnetic disc, or the like for recording image data of captured and encoded images. In the case where the CPU 101 records data in the storage medium 120, the data is stored as file data in a format suitable for the file system of the storage medium. As used herein, the file data refers to a container such as an MP4 file (ISO/IEC 14496-14: 2003), or an MXF (Material eXchange Format) file.

The detection unit 140 includes a gyro sensor, an acceleration sensor, or the like. The CPU 101 calculates, from the result of detection performed by the detection unit 140, a view direction (angle) and the amount of movement during image capturing of the image capturing apparatus 100. If, for example, the result of detection performed by the detection unit 140 is an angular speed or an acceleration, the CPU 101 performs integration so as to calculate the angle and the position. By detecting the angle and the position, it is also possible to detect whether a panning operation (an operation of changing the image capture direction) and an image capture state (a state in which the shutter is fully pressed) are continuously performed.

The internal bus 130 is an internal bus for each processing unit to access the CPU 101 and the memory 102.

Details of Codec Unit 114

Figure 3:
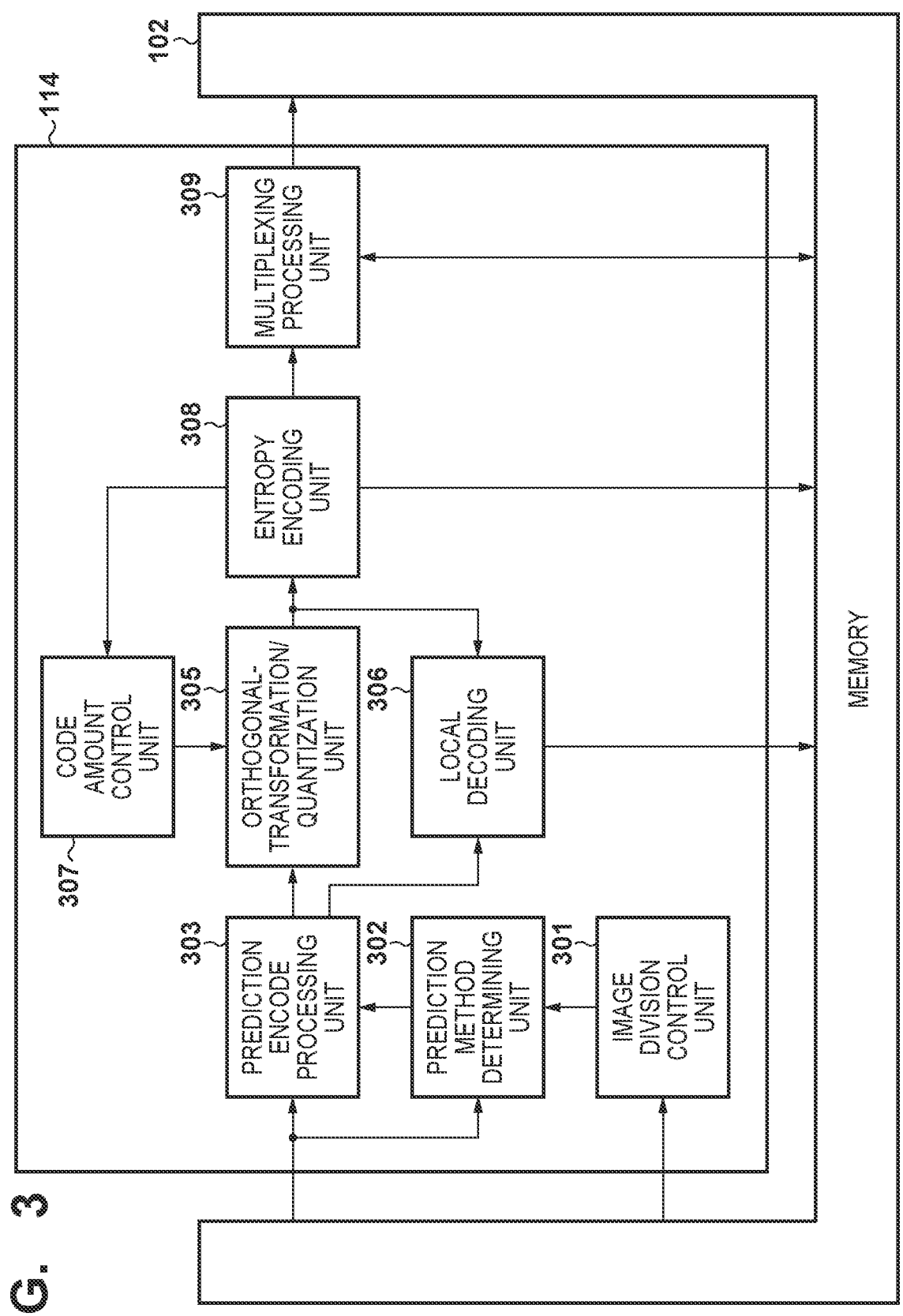
FIG. 3 is a block diagram of a codec unit according to the embodiment.

Next, a configuration and a flow of processing of the codec unit 114 according to the present embodiment will be described with reference to the block diagram shown in FIG. 3. In the present embodiment, it is assumed that a tile and a slice have the same size, but in the case where an image is divided only in the vertical direction, the image may be processed by dividing it into slices, and not into tiles. In addition, the present embodiment is directed to still images, and thus only intra-screen encoding will be described, and a description of inter-screen encoding is omitted here.

An image division control unit 301 divides a captured image based on parameters from the CPU 101. Depending on the content of an instruction, the image division control unit 301 may not divide a captured image. Here, division of an image into slices or tiles corresponds to "image division" as used in this specification. The size of an image obtained through image division is defined by the number of pixels in the vertical direction and the number of pixels in the horizontal direction.

The image division control unit 301 divides an encoding target image into tiles at determined coordinate positions, and assigns a number (hereinafter referred to as "tile number") to each region obtained through image division (hereinafter this region will be referred to simply as a "tile"). Then, the image division control unit 301 associates the tile number with the tile position in the encoding target image. The size of each tile is determined based on various types of information that indicates the number of CTBs (Cording Tree Blocks).

Then, the image division control unit 301 outputs, for each tile, a prediction encode processing condition to a prediction method determining unit 302 during encode processing. The prediction encode processing condition contains information that, when encoding a pixel block of interest within a tile, defines a range for acquiring a predicted pixel block of the pixel block of interest (encoding target block), the details of which will be described later. Here, a description will be given assuming that the pixel block is composed of, for example, 8×8 pixels, but the present invention is not limited thereto.

The prediction method determining unit 302 determines a prediction method for each pixel block in an encoding target screen based on the image division information and the prediction encode processing condition input from the image division control unit 301. The prediction method determining unit 302 calculates an evaluation value that indicates encoding efficiency by performing simple intra-screen prediction based on an input image signal and encoded pixel values read out from the memory 102 in which decoded images that have undergone encoding are stored. Then, the prediction method determining unit 302 determines a prediction format suitable for optimal encoding efficiency, and outputs an encoding parameter for specifying the determined prediction format to a prediction encode processing unit 303.

When encoding a pixel block of interest within a tile of interest in an encoding target frame, the prediction encode processing unit 303 generates a predicted pixel block from an encoded image read out from the memory 102 according to the parameter for prediction encode processing determined by the prediction method determining unit 302. Then, the prediction encode processing unit 303 outputs, to an orthogonal-transformation/quantization unit 305, a prediction difference block that is a difference between the pixel block of interest and the predicted pixel block. Also, the prediction encode processing unit 303 outputs the predicted pixel block to a local decoding unit 306.

The orthogonal-transformation/quantization unit 305 performs orthogonal-transformation processing (typically DCT) on the received prediction difference block. Also, the orthogonal-transformation/quantization unit 305 quantizes a coefficient obtained through orthogonal-transformation by using a quantization step according to a quantization parameter set by a code amount control unit 307, which will be described later. The quantized coefficient (quantization data) is supplied to an entropy encoding unit 308, and the local decoding unit 306.

The local decoding unit 306 generates prediction difference data by performing inverse quantization processing and inverse orthogonal-transformation processing on the input quantization data. Then, the local decoding unit 306 performs decode processing by adding the generated prediction difference data to the predicted pixel block input from the prediction encode processing unit 303, and thereby generates a pixel block. Then, the local decoding unit 306 stores the generated pixel block in the memory 102 so as to encode a subsequent pixel block that is subsequent to the pixel block of interest. The decoded image data stored in the memory 102 is used in intra-screen prediction processing performed thereafter. Furthermore, the decoded pixel block that has undergone deblocking filter processing is stored in the memory 102.

The entropy encoding unit 308 performs entropy encode processing based on CABAC (Context Adaptive Binary Arithmetic Coding) on the input quantization data on a slice-to-slice basis. Accordingly, the entropy encoding unit 308 includes a binary unit for converting input quantization data (multi-valued data) to binary data, and a binary data memory for storing the binary data generated by the binary unit. Also, the entropy encoding unit 308 includes: a context calculation unit that calculates a probability of occurrence of binary data according to context, and stores the probability of occurrence of binary data; and an arithmetic coding unit that performs arithmetic coding according to the probability of occurrence supplied from the context calculation unit. The entropy encoding unit 308 supplies the data encoded in the manner described above to the memory 102 or a multiplexing processing unit 309, and outputs the generated code amount to the code amount control unit 307.

The code amount control unit 307 is a processing unit that controls a code amount of encoded data so as to prevent an encoding picture buffer from over-flowing or under-flowing. The code amount control unit 307 generates a quantization parameter for a frame that is subsequently input, based on the generated code amount after entropy encoding supplied from the entropy encoding unit 308, and supplies the generated quantization parameter to the orthogonal-transformation/quantization unit 305.

The multiplexing processing unit 309 stores, in a file header, syntaxes of, for example, the image size, the number of tiles obtained through image division, the image size of each tile, the tile number, the range of a display region, and the like. The multiplexing processing unit 309 may designate preliminary values as the syntax values, store the preliminary values in the memory 102 or the storage medium 120, and rewrite the stored preliminary values.

The syntax of the image size in the horizontal direction is pic_width_in_luma_samples, and the syntax of the image size in the vertical direction is pic_height_in_luma_samples.

The syntax of the number of tiles obtained through image division in the horizontal direction is num_tiles_columns_minus 1, and the syntax of the number of tiles obtained through image division in the vertical direction is num_tile_rows_minus 1.

The syntax of the image size of each tile in the horizontal direction is column_width_minus 1 [i], and the syntax of the image size of each tile in the vertical direction is column_height_minus 1 [i].

The syntax of the left end offset of the display region is conf_win_left_offset. The syntax of the right end offset of the display region is conf_win_right_offset. The syntax of the upper end offset of the display region is conf_win_top_offset. The syntax of the lower end offset of the display region is conf_win_bottom_offset.

The tile number may be omitted if both the encoding apparatus and the decoding apparatus perform coding on tiles in a raster scan order.

Overall Processing Flow of Image Capturing Apparatus 100

Figure 4A:
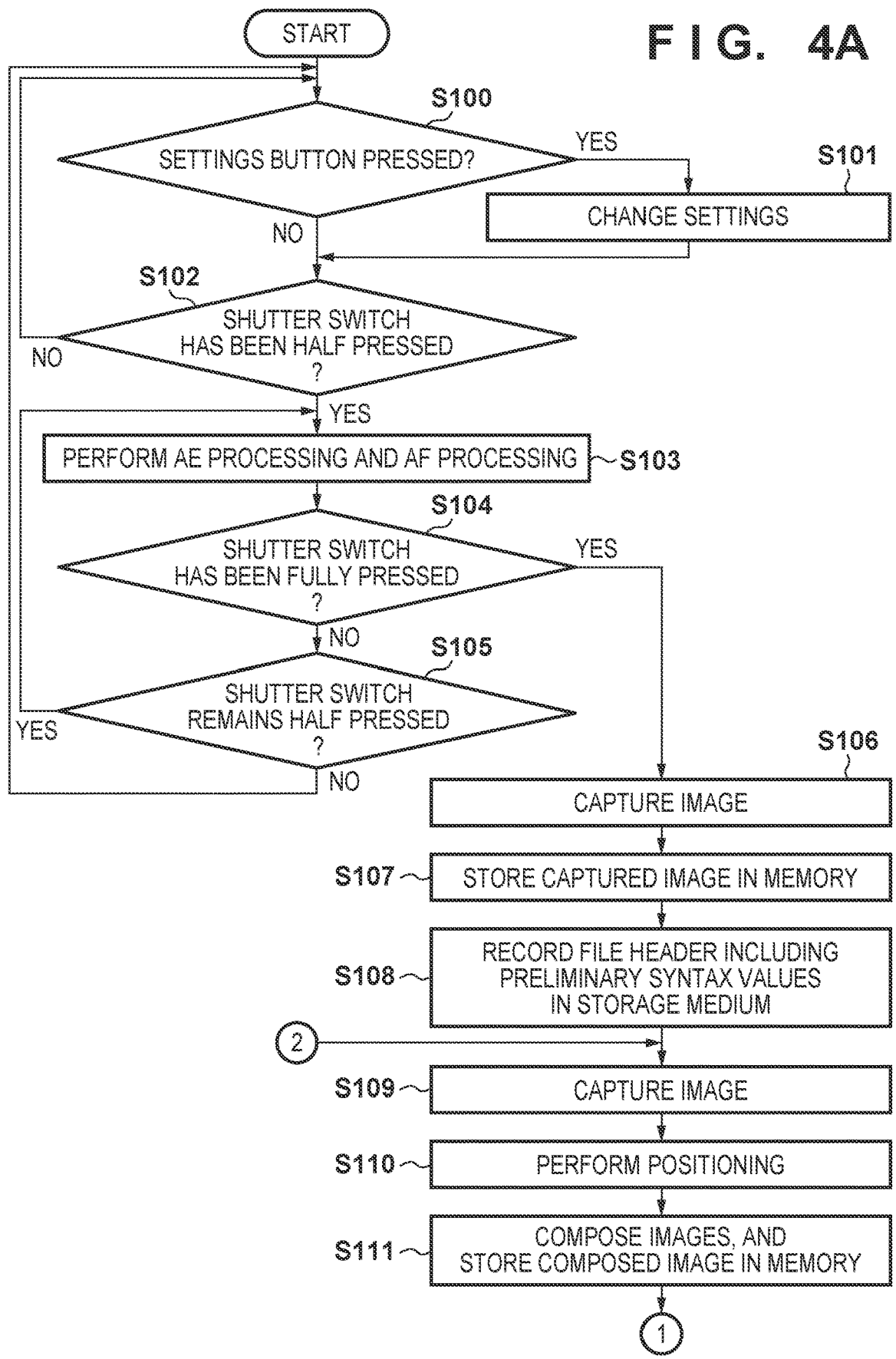
FIGS. 4A and 4B are flowcharts illustrating encode processing according to the embodiment.
Figure 4B:
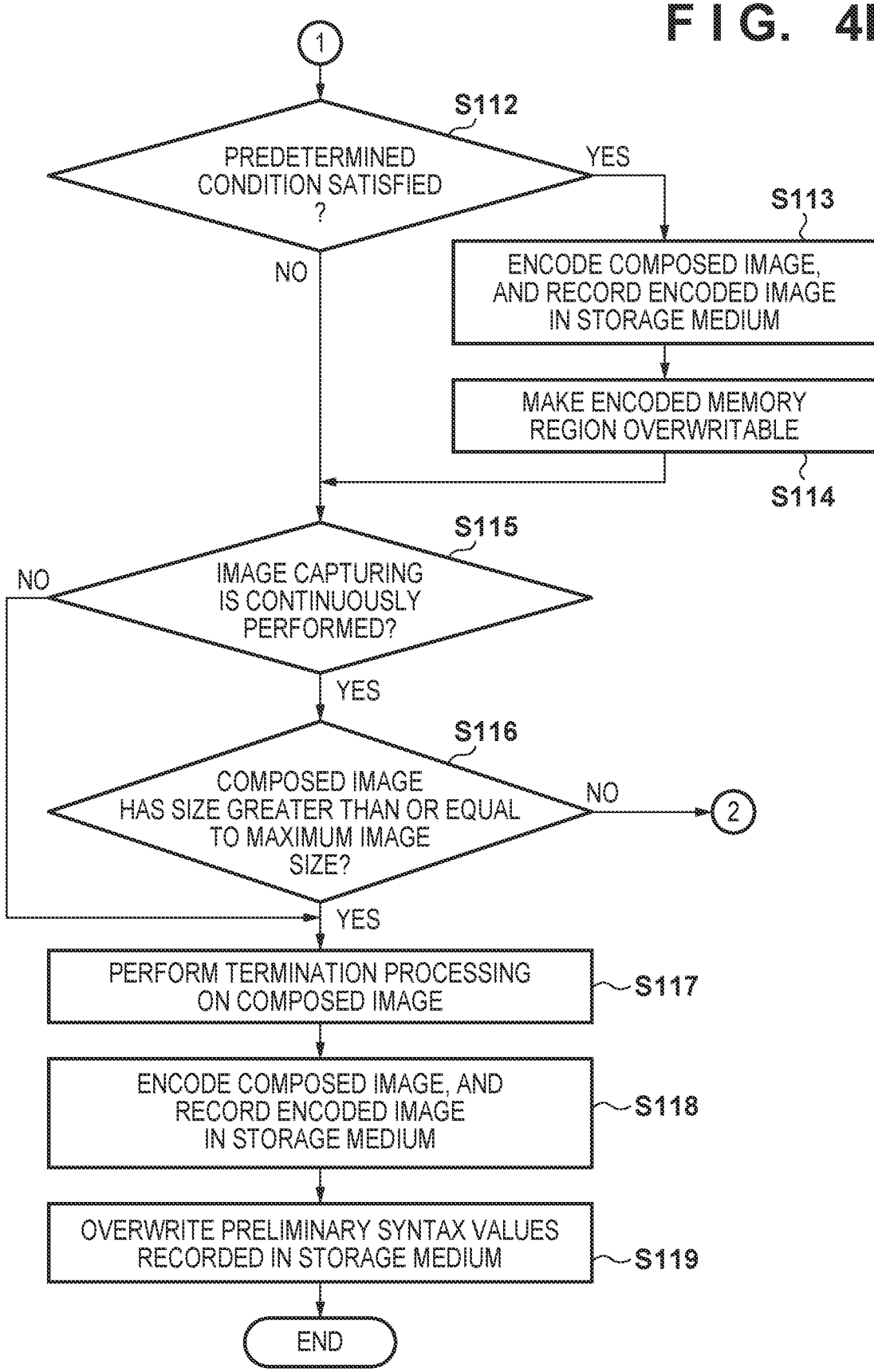

FIGS. 4A and 4B show examples of overall processing performed by the image capturing apparatus 100. FIGS. 4A and 4B are flowcharts illustrating a flow of processing performed in a wide-angle composition mode that is processing according to the present embodiment. The processing shown in FIGS. 4A and 4B is executed when the wide-angle composition mode is selected via the mode switching switch provided on the operation unit 104.

The control program for the flowchart according to the present embodiment is stored in the non-volatile memory 103, and is loaded into the memory 102 when the image capturing apparatus 100 is powered on, and then executed by the CPU 101. The control program of the image capturing apparatus 100 according to the present embodiment may repeatedly execute the processing on a periodic basis.

In the present embodiment, processing will be described assuming that the user performs continuous image capturing while performing a panning operation of moving the image capturing apparatus 100 in the horizontal direction, so as to generate and encode a wide-angle image. Accordingly, note in the following description that the view direction of the image capturing apparatus 100 moves in the horizontal direction each time image capturing is performed. Note also that, in the present embodiment, tiles from the first tile that is encoded first and the tile that is the second to the last encoded tile are encoded at the same size. This tile size will be referred to as "reference tile size". Also, the number of pixels that corresponds to the length of a reference tile in the vertical direction is greater than the number of pixels of an image captured by the image capturing unit 112 in the vertical direction by a pre-set value or more. This value is provided so as to absorb vibration in the vertical direction when the user performs a panning operation in the horizontal direction, and can be set as appropriate.

In S100, the CPU 101 determines whether or not a settings button provided on the operation unit 104 has been pressed. The CPU 101 advances the processing of the flowchart from S100 to S101 if it is determined that the settings button has been pressed, and then advances the processing of the flowchart from S100 to S102 if it is determined that the settings button has not been pressed. In the case where no change is made to the settings, and the image capturing apparatus 100 is operated for the first time, initial settings values are used.

In S101, the CPU 101 changes the settings, such as the panning angle and the panning direction at the time of image capturing, and the resolution (size) of a wide-angle composite image to be generated in response to the operations of the user performed on the operation unit 104. The CPU 101 determines, based on the settings, the reference tile size, the size of a storage region for storing a composed image (hereinafter referred to as "composed image region"), and the maximum image size, and then advances the processing of the flowchart from S101 to S102.

In S102, the CPU 101 determines whether the shutter switch provided on the operation unit 104 has been half pressed. If it is determined in S102 that the shutter switch has been half pressed, the CPU 101 advances the processing of the flowchart from S102 to S103. If it is determined in S102 that the shutter switch has not been half pressed, the CPU 101 returns the processing of the flowchart from S102 to S100.

In S103, the CPU 101 performs AE processing and AF processing, and then advances the processing of the flowchart from S103 to S104.

In S104, the CPU 101 determines whether the shutter switch provided on the operation unit 104 has been fully pressed. If it is determined in S104 that the shutter switch has been fully pressed, the CPU 101 advances the processing of the flowchart from S104 to S106. If it is determined in S104 that the shutter switch has not been fully pressed, the CPU 101 advances the processing of the flowchart from S104 to S105.

In S105, the CPU 101 determines whether the shutter switch provided on the operation unit 104 remains half pressed. If it is determined in S105 that the shutter switch remains half pressed, the CPU 101 returns the processing of the flowchart from S105 to S103. If it is determined in S105 that the shutter switch is not half pressed (the shutter switch has been released), the CPU 101 returns the processing of the flowchart from S105 to S100.

In S106, the CPU 101 causes the image capturing unit 112 to perform first image capturing in continuous image capturing.

In S107, the CPU 101 stores an image captured in S106 in the composed image region provided in the memory 102. Then, the CPU 101 advances the processing from S107 to S108.

Here, an example of processing performed in S107 according to the present embodiment will be described with reference to FIGS. 5A to 5C. In the present embodiment, as shown in FIG. 5A, it is assumed that three regions (tile 1 to tile 3) are allocated as the composed image region for one image. The three regions shown in FIG. 5A have the same size as the reference tile size. The size of a reference tile in a direction vertical to the panning direction is larger than the image size of a captured image. In the case where an image whose size has been reduced from a captured image is used for image composition, the size of a reference tile is set to a size larger than the image size of the image whose size has been reduced.

Figure 5C:
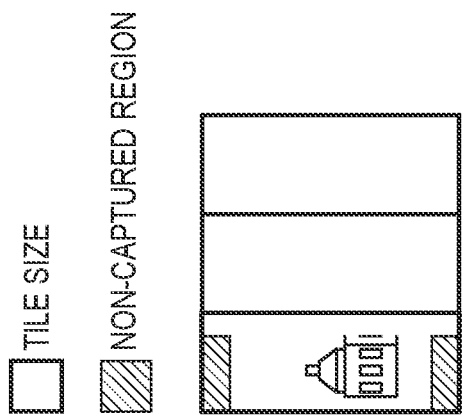
FIGS. 5A to 5C are diagrams showing the relationship between composed image region, tile size, and non-captured region according to the embodiment.
Figure 5B:
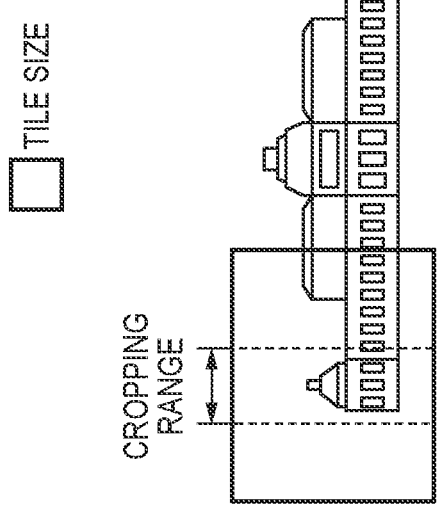
Figure 5A:
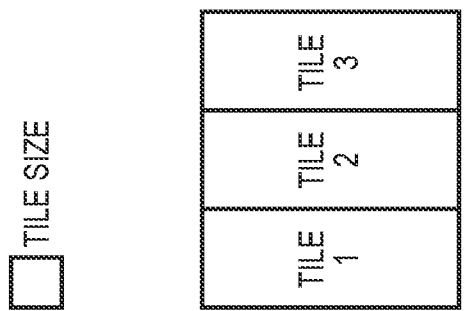

As shown in FIG. 5B, the center portion of the captured image is cropped, and the cropped image is stored in tile 1 in the composed image region allocated in the memory 102 as shown in FIG. 5C. At this time, the composed image region has a larger size in the direction vertical to the panning direction. Accordingly, the first captured image is stored in the composed image region in the memory 102 such that a non-captured region is provided on the upper and lower ends of the cropped image, and the cropped image is located at the center. Then, the CPU 101 writes a "black"

pixel value into each of all pixels of the non-captured region (hereinafter referred to as "colors the composed image region in black"). The pixel value written into the non-captured region may be a "white" pixel value written into all pixels, a "gray" pixel value written into all pixels, or any other determined image pattern. The range of a cropped image may be determined according to the amount of panning calculated from the result of detection performed by the detection unit 140.

In S108, the CPU 101 records, in the storage medium 120, a file header that includes information in which preliminary values have been set for the syntaxes of the image size, the number of tiles obtained through image division, the tile size, and the display region by the multiplexing processing unit 309. Then, the CPU 101 advances the processing from S108 to S109.

In S109, the CPU 101 causes the image capturing unit 112 to perform image capturing. Then, the CPU 101 advances the processing from S109 to S110.

In S110, the CPU 101 positions the cropped image obtained by cropping the center portion of the image acquired in S109 with respect to a composed image already stored in the composed image region in the memory 102 by the image processing unit 113. The positioning is performed by dividing the image into small blocks of arbitrary size, and calculating, for each small block, a correspondence point at which SAD (Sum of Absolute Difference) in luminance is the smallest. This processing may be the same processing as that of a motion vector calculation method, or the like. Then, the CPU 101 stores the positioning information in the memory 102, and then advances the processing from S110 to S111.

In S111, the CPU 101 composes the image that has undergone positioning in S110 by the image processing unit 113 on the previous composed image, and stores the resulting composed image in the composed image region in the memory 102. That is, the composed image is updated. With respect to an image overlapping region, weighted summing is performed for image composition. After that, the CPU 101 advances the processing from S111 to S112.

In S112, the CPU 101 determines whether the updated composed image (storage region) stored in the composed image region in the memory 102 satisfies a predetermined condition. In the present embodiment, the predetermined condition is that the composed image stored in the composed image region in the memory 102 has a size greater than or equal to the tile size of a tile to be encoded. If it is determined in S112 that the composed image stored in the composed image region in the memory 102 has a size greater than or equal to the tile size of a tile to be encoded, the CPU 101 advances the processing from S112 to S113. If, on the other hand, it is determined in S112 that the composed image stored in the composed image region in the memory 102 has a size less than the tile size of a tile to be encoded next, the CPU 101 advances the processing from S112 to S115.

In S113, the CPU 101 causes the codec unit 114 to encode the encoding target tile, and records the encoded HEVC stream in the storage medium 120. The CPU 101 stores the size information of the encoded tile in the memory 102. Then, the CPU 101 advances the processing from S113 to S114.

In S114, the CPU 101 makes the memory region of the tile encoded in S113 overwritable (releases the memory region). Then, the CPU 101 advances the processing from S114 to S115.

In S115, the CPU 101 determines whether image capturing is continuously performed by detecting whether or not the shutter switch provided on the operation unit 104 has been fully pressed, or detecting whether panning is continuously performed by the detection unit 140. If it is determined that image capturing is continuously performed, the CPU 101 advances the processing of the flowchart from S115 to S116. If it is determined that image capturing is not continuously performed, the CPU 101 advances the processing from S115 to S117.

In S116, the CPU 101 determines whether the composed image that has been composed through the processing up to S116 has a size greater than or equal to the intended maximum image size.

To be specific, the CPU 101 may determine whether or not the following equation has been satisfied:

$$W \le Tw \times n + Lw,$$

where the size (the number of pixels) in the horizontal direction of the intended wide-angle composite image is represented by W, the size in the horizontal direction of a tile in the composed image region is represented by Tw, the size in the horizontal direction of a composed image remaining in the composed image region after the release processing in S114 is represented by Lw, and the number of times the encode processing in S113 was performed is represented by n.

If it is determined that the composed image has a size greater than or equal to the maximum image size, the CPU 101 advances the processing from S116 to S117. If it is determined that the composed image has a size less than the maximum image size, the CPU 101 returns the processing from S116 to S109.

The CPU 101 may also advance the processing to S117 if it is determined in S116 that the shutter switch is released.

In S117, if it is necessary to additionally attach a termination image to an unencoded composed image remaining in the memory 102, the CPU 101 additionally attaches the termination image. Since the tile size of HEVC encoding is the size of a CTU (Coding Tree Unit), a black image is embedded such that a size corresponding to a multiple of CTU is attained. Hereinafter, this processing will be referred to as "termination processing". After that, the CPU 101 advances the processing from S117 to S118.

Figure 6A:
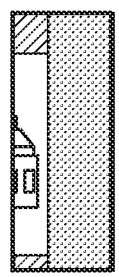
FIGS. 6A to 6C are diagrams showing an example of how a termination image is additionally attached according to the embodiment.
Figure 6B:
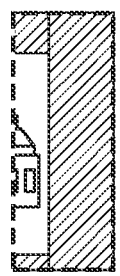
Figure 6C:
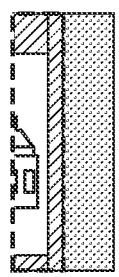

An example of termination processing will be described with reference to FIGS. 6A to 6C. It is assumed that an image as shown in FIG. 6A is stored in the composed image region in the memory 102. FIG. 6B shows an example in which the non-captured region has been colored in black such that the tile to be encoded has the same tile size as the reference tile size. FIG. 6C shows an example in which a black colored image is provided on the non-captured region so as to reduce the size of the tile to be encoded. A black thick line indicates a reference tile size. A black dotted line indicates the tile size of a tile that is to be encoded last and to which a termination image has been additionally attached. A portion hatched by oblique lines indicates a non-captured region. A portion hatched by dots indicates an overwritable region.

In S118, the CPU 101 causes the codec unit 114 to encode the unencoded composed image that has undergone termination processing, and records the encoded HEVC stream in the storage medium 120. The CPU 101 stores the size information of the encoded tile in the memory 102. The CPU 101 advances the processing of the flowchart from S118 to S119.

In S119, the CPU 101 calculates an image size from the total sum of the tile size of the encoded tiles stored in the memory 102. Also, the CPU 101 calculates a display region from the positioning information stored in the memory 102. The CPU 101 causes the multiplexing processing unit 309 to overwrite the syntaxes of the image size, the number of tiles obtained through image division, the tile size, the display region included in the file header for which preliminary values have been set in the storage medium 120. The CPU 101 ends the processing of the flowchart.

Figure 7A:
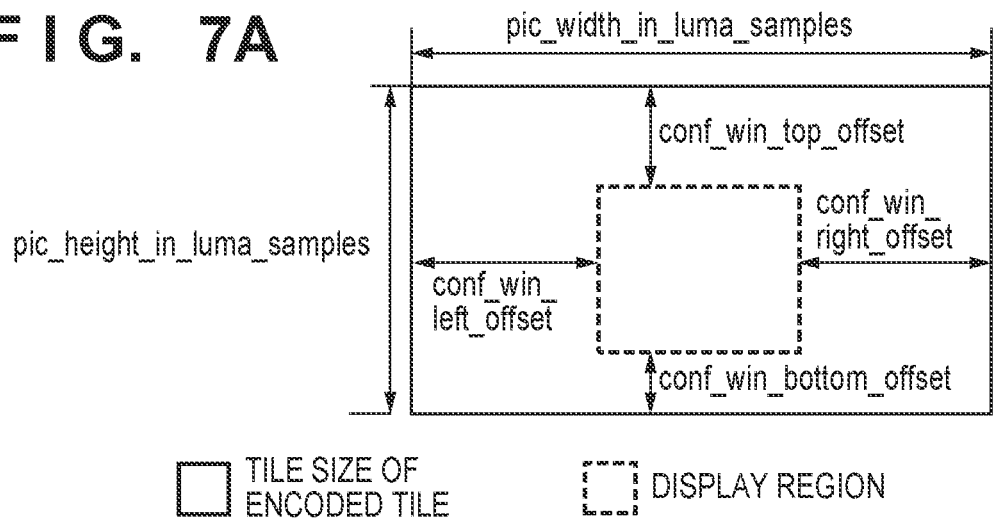
FIGS. 7A to 7D are diagrams showing an example of calculation of a display region according to the embodiment.
Figure 7B:
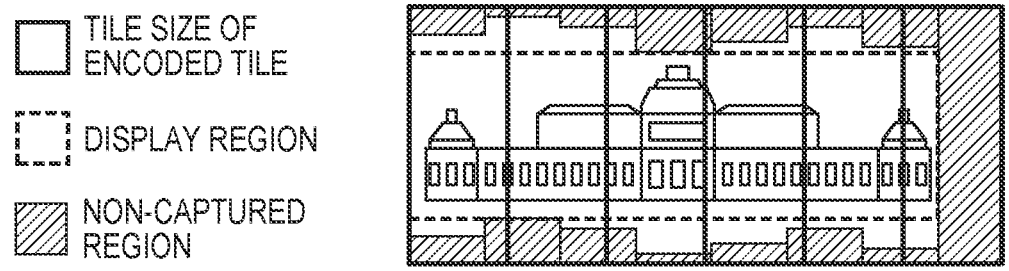
Figure 7C:
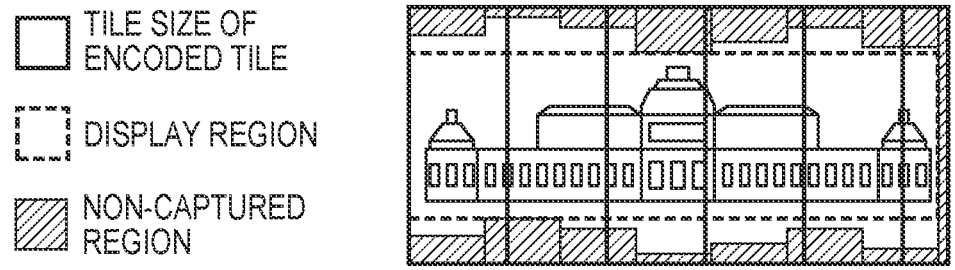

An example of calculation of a display region will be described with reference to FIGS. 7A to 7D. FIG. 7A is a diagram showing a relationship between the image size and the syntaxes of the display region. FIGS. 7B and 7C each show an image encoded with six tiles obtained by dividing the image in the horizontal direction. FIGS. 7B and 7C are different in terms of termination processing, with FIG. 7B being an image obtained by performing the termination processing shown in FIG. 6B, and FIG. 7C being an image obtained by performing the termination processing shown in FIG. 6C.

The display region is a rectangular region that includes only an image capture region. An image capture region in the direction vertical to the panning direction can be calculated from the amount of offset between positioned images. An image capture region in the same direction as the panning direction can be calculated from the sum of the tile size.

Figure 7D:
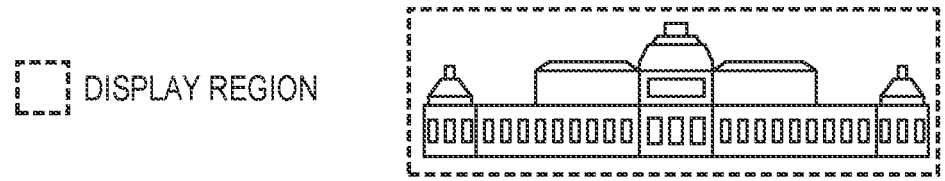

In FIGS. 7B to 7D, a black thick line indicates the tile size of an encoded tile, a black dotted line indicates a display region, and a portion hatched by oblique lines indicates a non-captured region. FIG. 7D is a diagram showing only a display region. The display regions in FIGS. 7B and 7C are the same region. The display region may be the largest rectangular region inscribed on the significant composed image shown in FIG. 7C.

Figure 8:
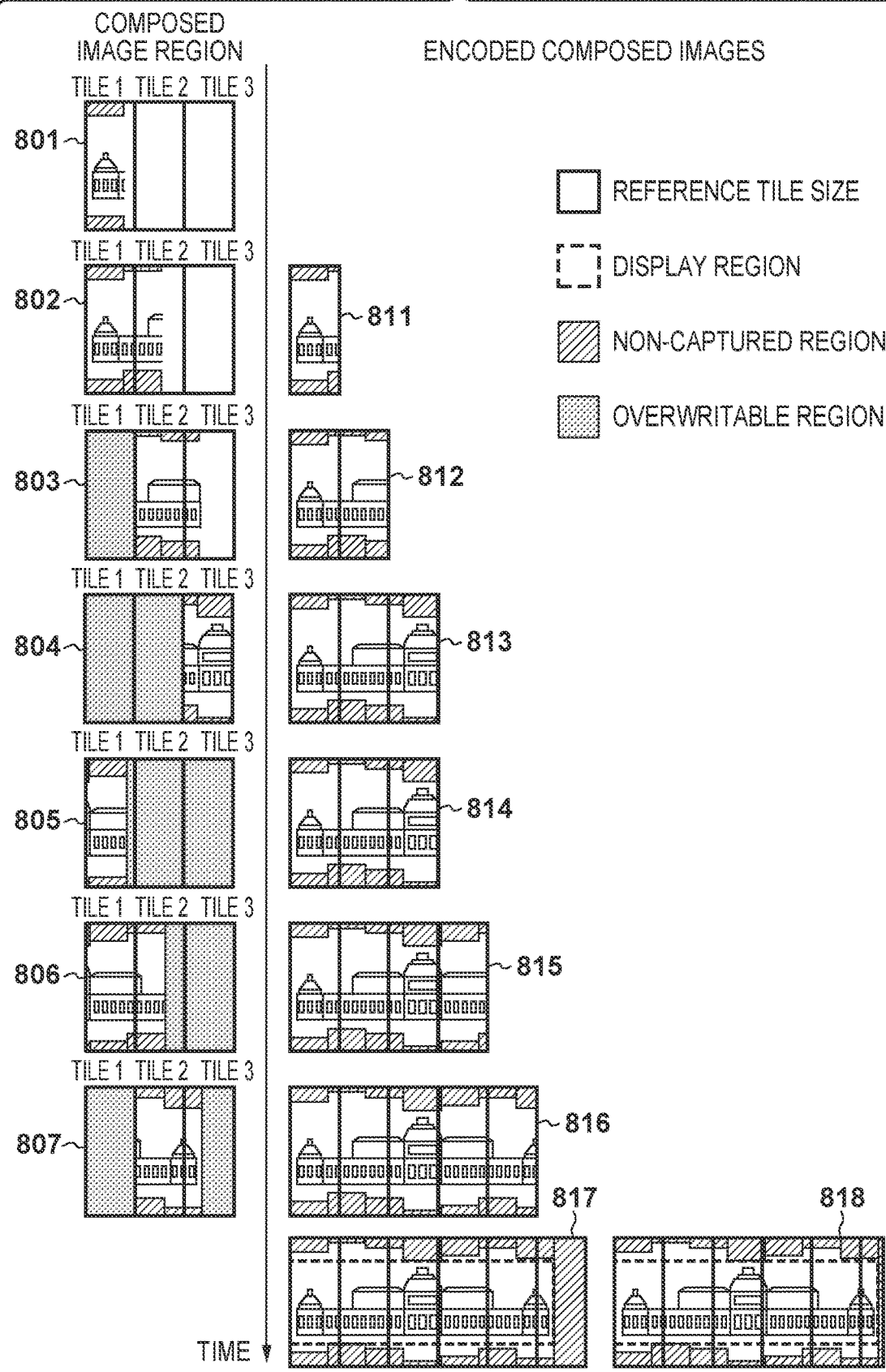
FIG. 8 is a diagram showing examples of images stored in a composed image region, and examples of encoded images according to the embodiment.

Next is a description of storing images in the composed image region allocated in the memory 102, and transition of encode processing according to the present embodiment, with reference to FIG. 8. In the diagram, it is assumed that time flows from top to bottom.

Reference numerals 801 to 807 denote images that are stored in the composed image region, and reference numerals 811 to 818 denote encoded composed images. Composed images 817 and 818 are provided to show a difference in termination processing. In FIG. 8, a black thick line indicates the reference tile size. A black dotted line shown in the composed images 817 and 818 indicates a display region. In FIG. 8, a portion hatched by oblique lines indicates a non-captured region. In FIG. 8, a portion hatched by dots in the composed image region indicates an overwritable region.

A partial image that has been cropped from an image obtained by first image capturing (S106) is stored in tile 1 in the composed image region (state 801). Then, a partial image that has been cropped from an image captured next is positioned and composed with the image stored in tile 1 (state 802). State 802 shown in the diagram shows that the composed image spans tiles 1 and 2. That is, tile 1 may be encoded. For this reason, the image of tile 1 is subjected to encode processing (composed image 811). After the image of tile 1 has been encoded, tile 1 is released so as to be overwritable (S114).

The partial image that has been cropped from an image captured next is composed on tile 2. An excess portion of the partial image composed on tile 2 is stored in tile 3. Then, when tile 2 includes an encode unit image (state 803), the image of tile 2 is encoded (composed image 812).

After that, processing is repeated in the following order: tile 3→tile 1→tile 2, and so on until the user releases the shutter switch, or a composed image of the originally intended size is generated.

As a result, unlike conventional technology that requires a memory for storing a plurality of images so as to generate a wide-angle composite image, in the present embodiment, a wide-angle composite image can be generated as long as a composed image region can be allocated in the memory 102 as described above, without relying on the number of times of image capturing to generate a wide-angle composite image. Also, encoding is performed each time a composed image of an encode unit tile is formed in the composed image region while the user is performing image capturing and a panning operation. Accordingly, encoding of a wide-angle composite image ends at the timing when the last image capturing of wide-angle composition ends, as a result of which a delay time caused by encoding can be reduced significantly as compared with conventional technology.

In the present embodiment, as the predetermined condition for starting encoding, a condition that the image stored in the composed image region has a size greater than or equal to the tile size of a tile to be encoded is used, but any other condition may be used. For example, a condition may be used that the image stored in the composed image region has a size greater than the tile size, or a size greater than or equal to a pre-set size.

Alternatively, as the predetermined condition for starting encoding, a condition may be used that images have been stored in two frames or more, for example, in a first tile to be encoded and a second tile that is adjacent to the first tile. Take FIG. 5A as an example, if it is assumed that the region to be encoded next is tile 1, a condition that images of two frames or more have been stored in tile 2 may be used as the predetermined condition for starting encoding.

Alternatively, as the predetermined condition for starting encoding, a condition may be used that an image has been stored in a third tile that is adjacent to a second tile and is to be encoded after the second tile, the second tile being adjacent to a first tile to be encoded next and is to be encoded after the first tile. Take FIG. 5A as an example, if it is assumed that the region to be encoded next is tile 1, a condition that an image has been stored in tile 3 may be used as the predetermined condition for starting encoding.

Also, in the present embodiment, processing has been described in which a wide-angle image is generated and encoded while continuous image capturing is performed by panning the image capturing apparatus 100 in the horizontal direction, but it is also possible to generate and encode a wide-angle image while continuous image capturing is performed by panning the image capturing apparatus 100 in the vertical direction. In this case, the panning direction may be selected from the horizontal direction and the vertical direction when the wide-angle composition mode is set. Then, if the horizontal direction is selected, the processing described above may be performed, and if the vertical direction is selected, the processing described above may be performed at an angle rotated by 90 degrees.

Second Embodiment

In a second embodiment, processing will be described in which encoding is performed after the images stored in the composed image region satisfy a predetermined condition, and the composed image region is made overwritable after the encoded stream is stored in a memory. Also, in the second embodiment, processing will be described in which a file header is recorded in a storage medium after all image regions have been encoded, and the encoded stream stored in the memory is recorded in the storage medium. The configuration of the apparatus is the same as that of the first embodiment, and thus a description thereof is omitted here.

Figure 9A:
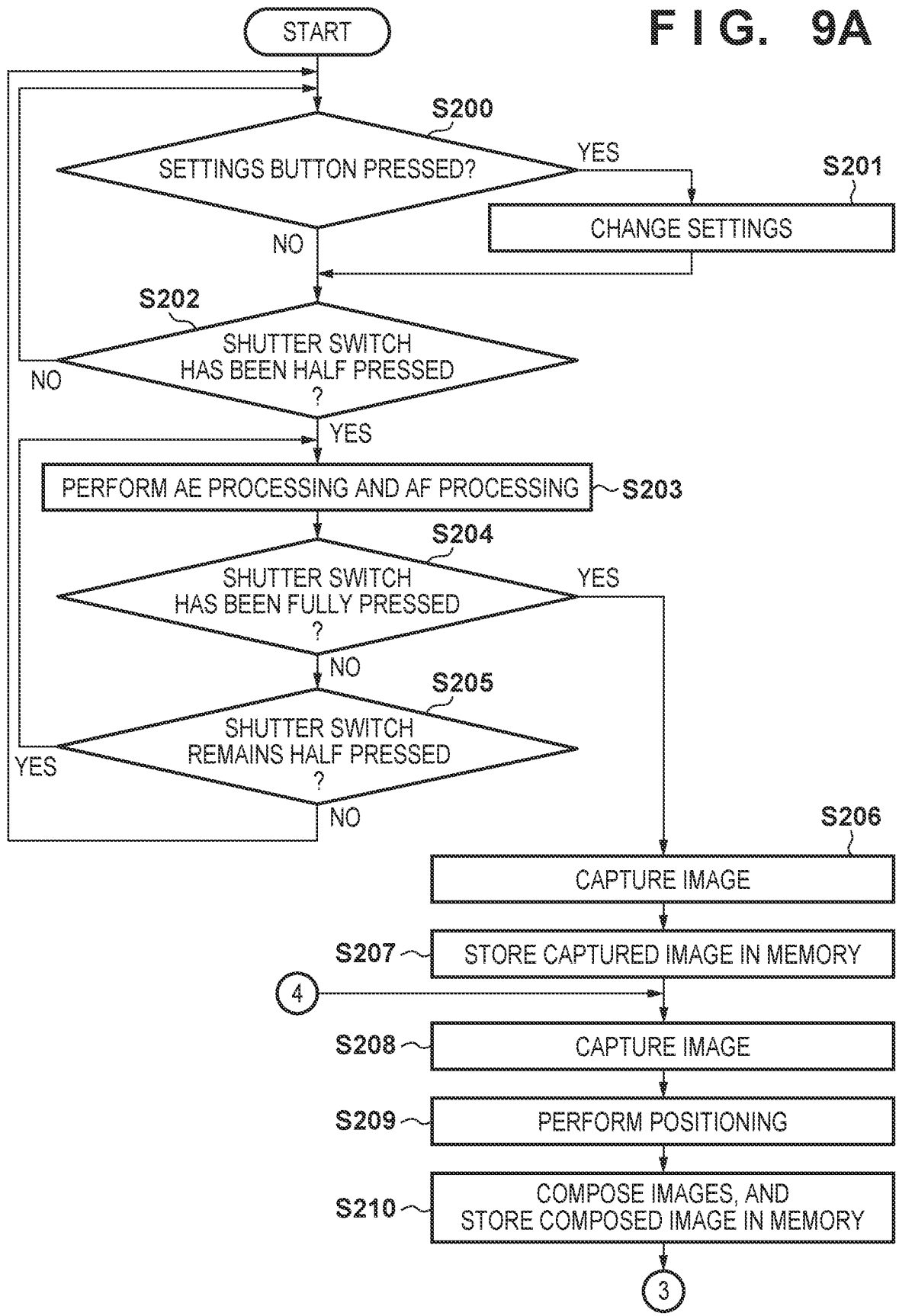
FIGS. 9A and 9B are flowcharts illustrating encode processing according to a second embodiment.
Figure 9B:
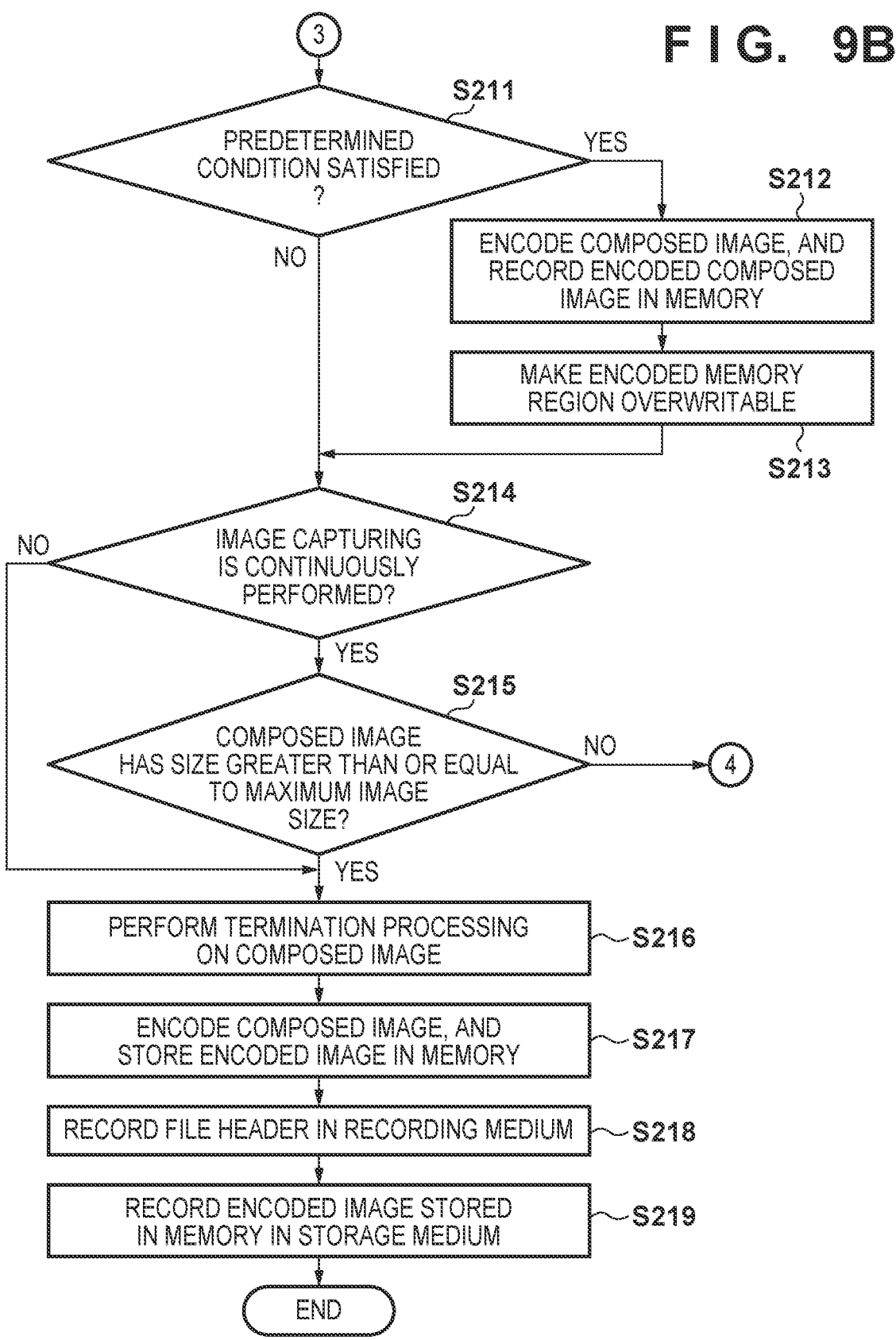

FIGS. 9A and 9B are flowcharts illustrating a flow of processing performed in the wide-angle composition mode that is processing according to the second embodiment.

In FIGS. 9A and 9B, the processing from S200 to S207, the processing from S208 to S211, and the processing from S213 to S216 are the same as the processing from S100 to S107, the processing from S109 to S112, and the processing from S114 to S117 shown in FIGS. 4A and 4B, and thus a description thereof is omitted here.

In S212, the CPU 101 causes the codec unit 114 to encode the encoding target tile. The CPU 101 temporarily stores the HEVC stream obtained through encoding in the memory 102. Also, the CPU 101 stores the size information of the encoded tile in the memory 102. Then, the CPU 101 advances the processing from S212 to S213.

In S217, the CPU 101 causes the codec unit 114 to encode the composed image that has undergone termination processing. Then, the CPU 101 stores the HEVC stream obtained through encoding in the memory 102. Also, the CPU 101 stores the size information of the encoded tile in the memory 102. Then, the CPU 101 advances the processing from S217 to S218. Note that, at this time, all encoded data of the wide-angle composite image is stored in the memory 102.

In S218, the CPU 101 calculates an image size from the total sum of the tile size of the encoded tiles stored in the memory 102. Also, the CPU 101 calculates a display region from the positioning information stored in the memory 102. The CPU 101 causes the multiplexing processing unit 309 to record, in the storage medium 120, a file header that includes syntaxes of the image size, the number of tiles obtained through image division, the tile size, and the display region, and the like. Then, the CPU 101 advances the processing from S218 to S219.

In S219, the CPU 101 sequentially reads out an encoded HEVC stream stored in the memory 102, records the read-out HEVC stream in the storage medium 120, and thereby produces a wide-angle composite image file. Then, the CPU 101 ends the processing of the flowchart.

Third Embodiment

In a third embodiment, an example will be described in which a reduced image of a composed image is generated as a thumbnail image, and the reduced composed image is also encoded and stored as part of a file. Also, in the third embodiment, it is assumed that the reduced composed image is not divided before encoding. The configuration of the apparatus is the same as that of the first embodiment, and thus a description thereof is omitted here.

Figure 10A:
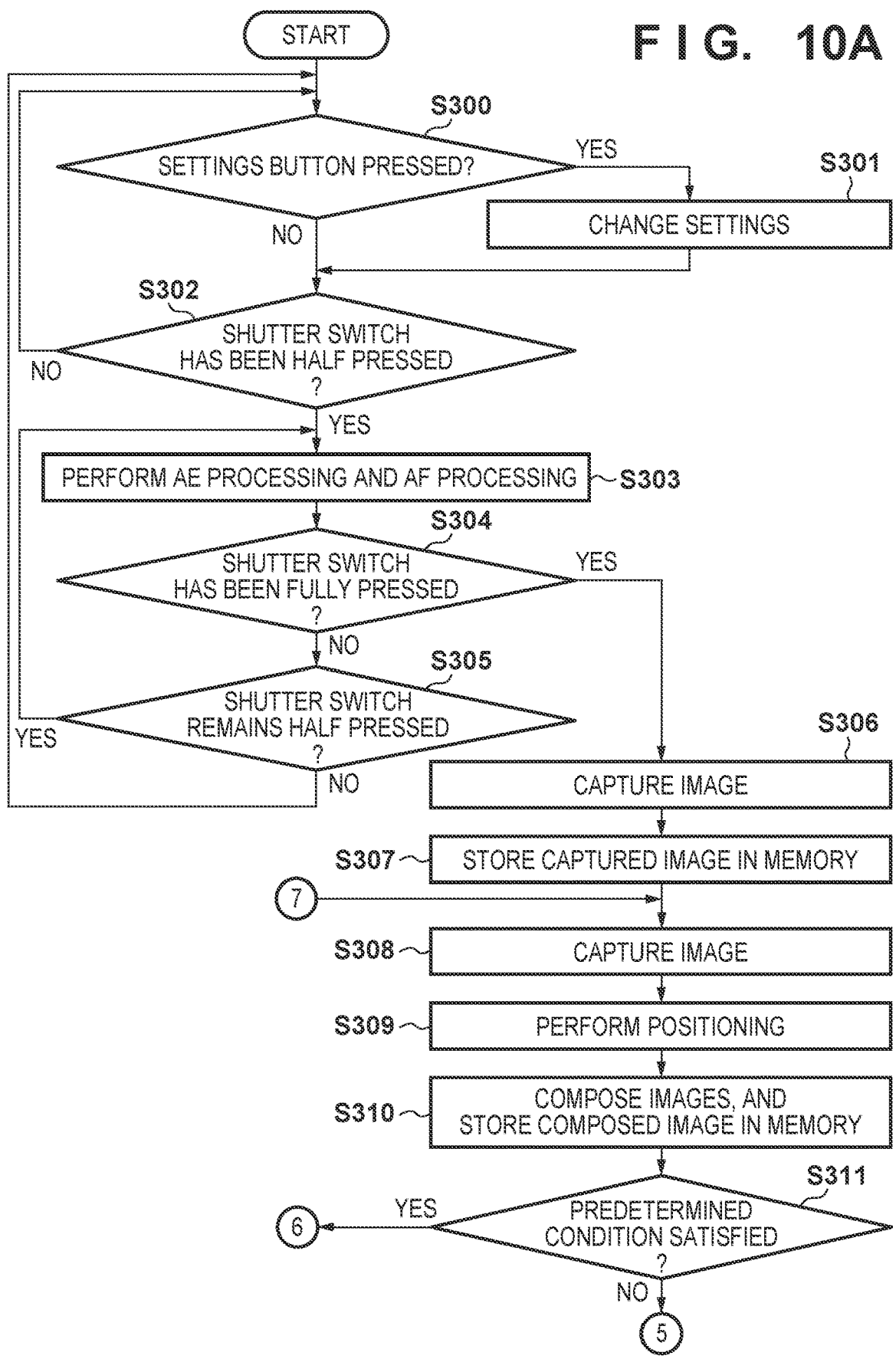
FIGS. 10A and 10B are flowcharts illustrating encode processing according to a third embodiment.
Figure 10B:
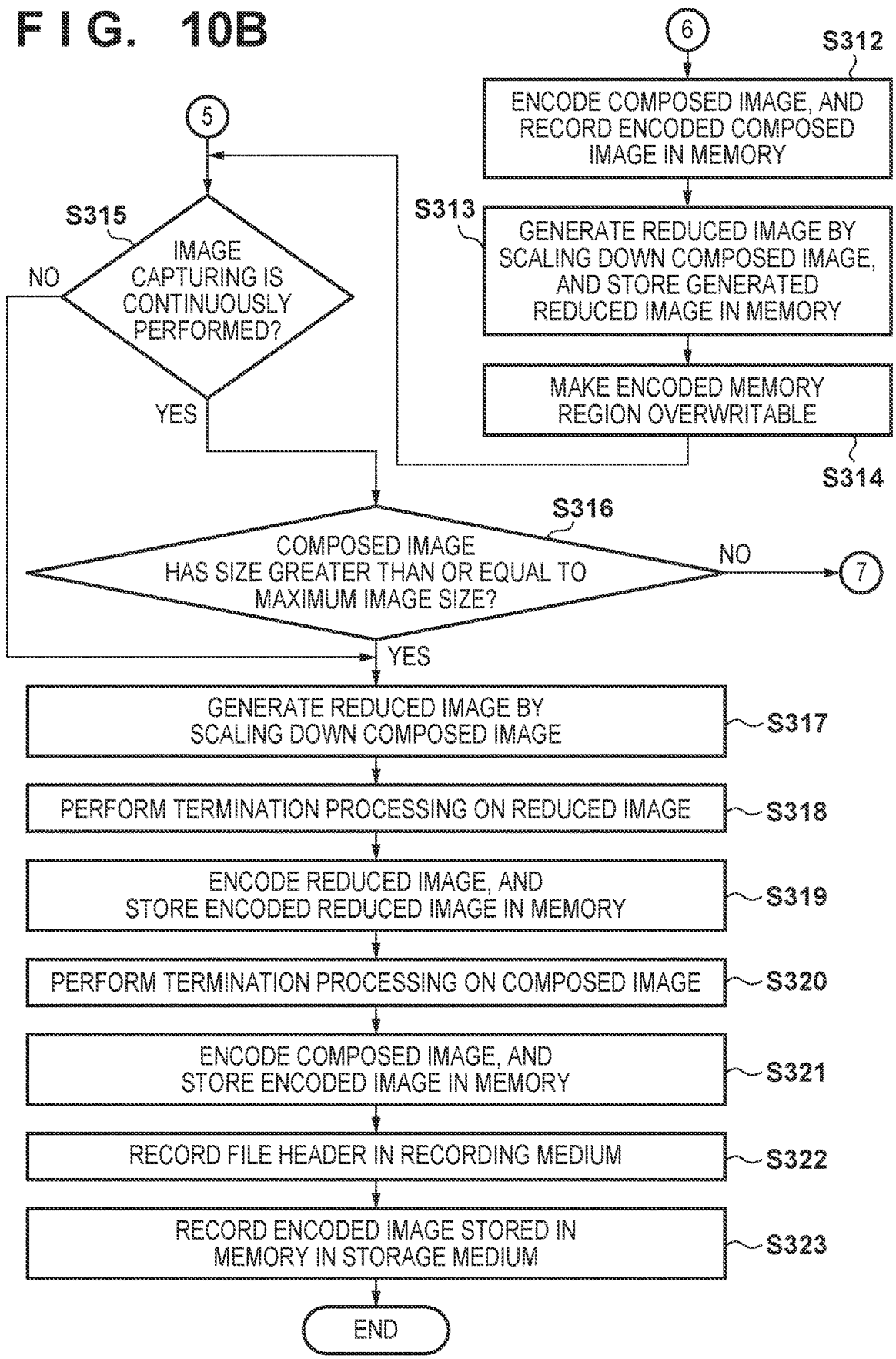

FIGS. 10A and 10B are flowcharts illustrating a flow of processing performed in the wide-angle composition mode according to the third embodiment. In the diagram, the processing from S300 to S312, the processing from S314 to S316, and the processing from S320 to S321 are the same as the processing from S200 to S212, the processing from S213 to S215, and the processing from S216 to S217 shown in FIGS. 9A and 9B, and thus a description thereof is omitted here.

In S313, the CPU 101 generates a reduced image of the composed image encoded by the image processing unit 113 in S312, and stores the generated reduced image in the memory 102. Here, it is assumed that the memory 102 has a storage capacity for reduced composed images allocated according to the settings in S300 or S301. Then, the CPU 101 advances the processing from S313 to S314.

In S317, the CPU 101 causes the image processing unit 113 to generate a reduced composed image, and stores the generated reduced composed image in the memory 102. Then, the CPU 101 advances the processing from S317 to S318.

In S318, the CPU 101 causes the image processing unit 113 to perform termination processing on the reduced composed image. Then, the CPU 101 advances the processing from S318 to S319.

In S319, the CPU 101 causes the codec unit 114 to encode the reduced composed image stored in the memory 102, and store the result (encoded data) in the memory 102. Then, the CPU 101 advances the processing from S319 to S320.

In S322, the CPU 101 calculates an image size from the total sum of the tile size of the encoded tiles stored in the memory 102. Also, the CPU 101 calculates a display region from the positioning information stored in the memory 102. The CPU 101 causes the multiplexing processing unit 309 to record, in the storage medium 120, a file header that includes syntaxes of the image size, the number of tiles obtained through image division, the tile size, the display region, and thumbnail image information, and the like. Then, the CPU 101 advances the processing from S322 to S323.

In S323, the CPU 101 sequentially reads out an encoded stream that includes a stream of encoded reduced composed images stored in the memory 102, and records the read encoded stream in the storage medium 120. Then, the CPU 101 ends the processing of the flowchart.

Other Embodiments

The image capturing apparatus 100 according to each of the embodiments given above has been described as an apparatus such as a digital camera, but it may be, for example, a smartphone as long as the apparatus has an image capturing function. Accordingly, the image capturing apparatus 100 according to each of the embodiments given above is not limited to a digital camera.

Various processing operations and functions described in the embodiments of the present invention can also be realized by a computer program. In this case, a computer program according to the present invention can be executed by a computer (including a CPU and the like), and realize various functions described in the embodiments of the present invention.

It is needless to say that the computer program according to the present invention may implement various processing operations and functions described in the embodiments given above by using an OS (Operating System) or the like that runs on a computer.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-135657, filed Jul. 11, 2017 which is hereby incorporated by reference herein in its entirety.

What is claimed is:

1. An image encoding apparatus that encodes a wide-angle composite image obtained from a plurality of images captured while changing an image capture direction of an image capturing unit, the image encoding apparatus comprising:
a memory for temporarily storing an image; and
one or more processors which execute a program, wherein the one or more processors function as:
(1) a compositing unit that, each time a captured image captured by the image capturing unit is input, crops a partial image of a predetermined region in the input captured image, and positions and composes the partial image with a composed image obtained from a previously input captured image stored in the memory so as to update the composed image;
(2) an encoding unit that, each time the composed image updated by the compositing unit has a pre-set size of an encode unit tile, encodes the image of the encode unit tile in the composed image to generate code data of the encode unit tile, where the size of the encode unit tile is greater than the size of the predetermined region to be cropped;
(3) a recording unit that, each time the code data of the encode unit tile is generated by the encoding unit, records the code data of the encode unit tile, as an element of a file, in a non-volatile recording medium;
(4) a releasing unit that, each time the code data of the encode unit tile is recorded in the non-volatile recording medium by the recording unit, releases the tile of the image that is encoded so as to make the tile overwritable in the memory; and
(5) a control unit that (a) controls the compositing unit, the encoding unit, and the releasing unit so as to repeatedly perform operations until a pre-set condition is satisfied, (b) determines, if the pre-set condition is satisfied, a rectangle inscribed in a significant area within the composited image of the encode unit tiles having been recorded in the non-volatile recoding medium, and (c) records, in a header in the file in the non-volatile recording medium, information specifying the position and size of the determined rectangle, as a display region of the wide-angle composite image.

2. The apparatus according to claim 1, wherein, if it is determined that the pre-set condition is satisfied, the control unit causes the compositing unit to perform termination processing on an unencoded composed image, and causes the encoding unit to encode the composed image that has undergone the termination processing.

3. The apparatus according to claim 1, wherein the control unit (a) generates a thumbnail corresponding to the wide-angle composite image, (b) encodes the thumbnail to generate code data of the thumbnail, and (c) records the code data of the thumbnail in the header of the file.

4. The apparatus according to claim 1, wherein the control unit records, in the header of the file, a syntax of at least one of an image size, the number of tiles obtained through image division, an image size of each tile, a tile number, and the display region.

5. The apparatus according to claim 1, wherein the pre-set condition is that the wide-angle composite image of an intended size is obtained.

6. A control method of an image encoding apparatus which includes an image capturing unit, and a memory for temporarily storing an image, and which encodes a wide-angle composite image obtained from a plurality of images captured while changing an image capture direction of the image capturing unit by using the memory, the method comprising:
each time a captured image captured by the image capturing unit is input, cropping a partial image of a predetermined region in the input captured image, and positioning and composing the partial image with a composed image obtained from a previously input captured image stored in the memory so as to update the composed image;
each time the updated composed image has a pre-set size of an encode unit tile, encoding the image of the encode unit tile in the composed image to generate code data of the encoded unit tile, where the size of the encoded unit tile is greater than the size of the predetermined region to be cropped;
each time the code data of the encode unit tile is recorded in a non-volatile recording medium, releasing the tile of the image that is encoded so as to make the tile overwritable in the memory;
performing control so as to repeatedly perform the composing, encoding, and releasing operations until a pre-set condition is satisfied;
if the pre-set condition is satisfied, determining a rectangle inscribed in a significant area within the composited image of the encode unit tiles having been recorded in the non-volatile recoding medium; and
recording, in a header in a file in the non-volatile recording medium, information specifying the position and size of the determined rectangle, as a display region of the wide-angle composite image.

7. A non-transitory computer-readable storage medium storing a program which, when executed by a computer, causes the computer to execute the steps of a control method of an image encoding apparatus which includes an image capturing unit, and a memory for temporarily storing an image, and which encodes a wide-angle composite image obtained from a plurality of images captured while changing an image capture direction of the image capturing unit by using the memory, the method comprising:
each time a captured image captured by the image capturing unit is input, cropping a partial image of a predetermined region in the input captured image, and positioning and composing the partial image with a composed image obtained from a previously input captured image stored in the memory so as to update the composed image;

each time the updated composed image has a pre-set size of an encode unit tile, encoding the image of the encode unit tile in the composed image to generate code data of the encoded unit tile, where the size of the encoded unit tile is greater than the size of the predetermined region to be cropped;

each time the code data of the encode unit tile is recorded in a non-volatile recording medium, releasing the tile of the image that is encoded so as to make the tile overwritable in the memory;

performing control so as to repeatedly perform the composing, encoding, and releasing operations until a pre-set condition is satisfied;

if the pre-set condition is satisfied, determining a rectangle inscribed in a significant area within the composited image of the encode unit tiles having been recorded in the non-volatile recoding medium; and recording, in a header in a file in the non-volatile recording medium, information specifying the position and size of the determined rectangle, as a display region of the wide-angle composite image.

* * * * *